United States Patent [19]

Hargrave

[11] 4,261,723

[45] Apr. 14, 1981

[54] CONTROLLING KINKING OF TEMPERED GLASS SHEETS

[75] Inventor: Robert M. Hargrave, Fresno, Calif.

[73] Assignee: PPG Industries, Inc., Pittsburgh, Pa.

[21] Appl. No.: 66,703

[22] Filed: Aug. 15, 1868

[51] Int. Cl.³ ............................................. C03B 27/04
[52] U.S. Cl. ..................................... 65/114; 65/115; 65/348
[58] Field of Search ................. 65/114, 115, 348, 351

[56] References Cited

U.S. PATENT DOCUMENTS

| 3,245,772 | 4/1966 | Cypher et al. | 65/111 |
| 3,396,000 | 8/1968 | Carson et al. | 65/104 |
| 3,488,178 | 1/1970 | Welker et al. | 65/114 X |
| 3,497,340 | 2/1970 | Dennison et al. | 65/104 |
| 3,522,029 | 7/1970 | Carson et al. | 65/104 |
| 3,923,488 | 12/1975 | Pytel et al. | 65/114 |

*Primary Examiner*—Arthur D. Kellogg
*Attorney, Agent, or Firm*—Donald Carl Lepiane; Edward I. Mates

[57] ABSTRACT

Reducing kink in the leading edge portion of tempered flat glass sheets by applying a downward flow of air across the entire width of the leading edge portion of the upper surface only of the glass sheet as the sheet passes the boundary region between the exit of a furnace or heating area and the entrance into a cooling area where both upper and lower surfaces of the sheet are cooled throughout their entire extent to impart at least a partial temper to the sheet.

5 Claims, 4 Drawing Figures

CONTROLLING KINKING OF TEMPERED GLASS SHEETS

BACKGROUND OF THE INVENTION

1. Field of the Invention

The present invention relates to the tempering of flat glass sheets and particularly glass sheets that are produced on a gas hearth of the type depicted in U.S. Pat. No. 3,332,759 to McMaster et al or U.S. Pat. No. 3,223,501 to Fredley et al. However, the present invention is also suitable for use in tempering flat glass sheets using a roller type conveyor of the type depicted in U.S. Pat. No. 3,923,488 to Pytel et al.

The present invention particularly relates to the tempering of flat glass sheets that have at least one dimension exceeding about 3.3 feet (1 meter). Glass sheets that are supported horizontally or substantially horizontally tend to develop a kink or curl at their leading edge. This upward curl is noticeable even when associated with relatively small glass sheets. However, when tempering glass sheets having one or more dimensions greater than about 3.3 feet (1 meter), the leading edge of the glass sheet develops an enlarged, upward curl. In such larger glass sheets and in sheets of smaller dimension heated on a gas hearth, the leading edge curl is usually sufficiently severe to cause the glass sheet to depart from the flat shape desired by an amount sufficient for the glass to be outside tolerance requirements. Such severe edge curl leads to customer rejects. Leading edge curl is the deviation from flatness of the glass sheet measured in the direction of its thickness in its initial one foot (30 centimeters) of length.

In well-known commercial procedures for tempering glass sheets, the sheets are first heated to a temperature corresponding substantially to the softening point of the glass and then are chilled rapidly to a temperature below the annealing range of the glass to impart a temper. Coventionally, the sheet is heated while transported through an enclosed hot atmosphere of a furnace and propelled forwardly through the furnace exit into a cooling station comprising upper and lower plenums which flush the opposite surfaces of the sheet with streams of suitable tempering medium, such as air under predetermined pressure applied through arrays of nozzles which chill the glass and impart the desired stress patterns therein. Cooling air is directed against the opposite surfaces of the sheet while the sheet moves between the upper and lower plenums in order to impart the temper desired.

It is also well known to differentially cool the upper and lower surfaces to either induce warpage or reduce the amount of warpage that results from the thermal treatment of the moving glass sheets. Warpage has been controlled both transverse to the direction of glass sheet travel and parallel to the direction of glass sheet travel by differential heating and/or cooling of the opposite surfaces.

2. Description of the Prior Art

U.S. Pat. No. 3,245,772 to Cypher et al discloses warping of a glass sheet by differentially heating its opposite major surfaces followed by cooling differentially to reduce the curvature or warpage induced by differential heating.

U.S. Pat. No. 3,396,000 to Carson et al discloses the use of blowers in the region intermediate a furnace exit and an entrance to a cooling station to induce a transverse curvature about an axis of glass sheet movement by applying blasts of cooling air downward through a plurality of obliquely disposed air delivery pipes. The pipes face the side edge portions only of glass sheets passing therebeneath.

U.S. Pat. No. 3,497,340 to Dennison et al discloses a technique for controlling the onset of longitudinal warpage to facilitate the passage of a glass sheet to be bent to a compound shape between upper and lower arrays of nozzles before the compound shape takes place so as to enable the glass sheet to be suitably cooled between upper and lower blasts of cooling medium applied through said nozzles.

U.S. Pat. No. 3,522,029 to Carson et al discloses the shaping of a glass sheet to a preselected curvature by differentially chilling one of its surfaces from the central area toward an edge area.

U.S. Pat. No. 3,923,488 to Pytel et al discloses a technique for reducing upward curl at the leading edge of a glass sheet conveyed through a heated area and a cooling area by applying a cooling medium toward a portion of the lower surface of the glass sheet only in spaced relation to its leading edge. This application is started after the glass sheet leaves the furnace and before the glass portion reaches a position where both its upper and lower surfaces are cooled by exposure to opposing blasts of tempering medium. The entire length of glass sheet except for the leading one foot or so of length is subjected to this differential cooling treatment.

SUMMARY OF THE INVENTION

The present invention provides a relatively simple technique for reducing the upward curl in the leading edge portion of a glass sheet that is tempered by conveyance along a substantially horizontal path through a heating area and a bending area. According to the present invention, the upper surface only of the leading edge portion of the glass sheet is selectively cooled across its entire width as it passes the boundary region between the exit of the heating area and the entrance to the cooling area without any opposing application of cooling medium against the lower surface portion opposite thereto. As the glass continues to move into the cooling area the entire extent of both upper and lower surfaces are cooled. The selective cooling of the upper surface only in its leading edge portion is discontinued after a predetermined length of the leading edge portion of the glass sheet passes beneath the tempering medium application means and before the trailing edge of the glass sheet reaches the boundary region between the heating area or furnace and the cooling area.

BRIEF DESCRIPTION OF THE DRAWINGS

In the drawings which form part of a description of a preferred embodiment of the present invention and wherein like reference numbers refer to like structural elements.

DESCRIPTION OF A PREFERRED EMBODIMENT

Figure 2:
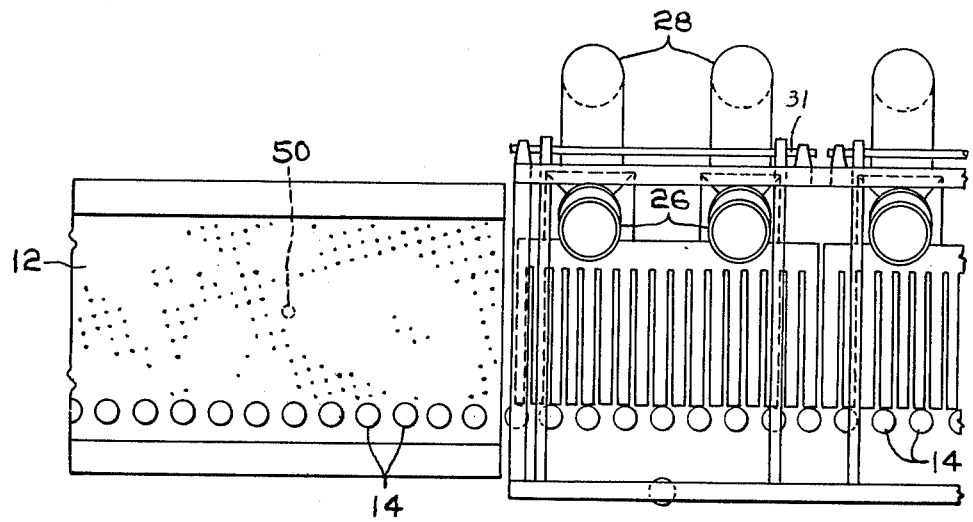
FIG. 2 is a horizontal section taken along the line 2—2 of FIG. 1.

Referring to the drawings, an illustrative embodiment of apparatus incorporating features of the invention comprises a gas hearth type furnace 10 of the type depicted in U.S. Pat. No. 3,223,501 to Fredley et al. In such a gas hearth furnace, glass sheets are introduced into a support area at a temperature below that at which the major surfaces will mar on physical contact with solid objects. The glass sheets are heated in turn above the deformation temperature while being supported primarily by gas supplied through apertures in a gas support bed 12 and the glass sheets are cooled after they leave the furnace to a temperature below deformation temperature before they are removed from the gas support. When glass sheets are so treated, the heating is usually supplied by hot gas through the gas support beds supplemented by radiant heat supplied by heaters within the furnace 10. The latter are usually electrical heaters although gas heaters may also be employed. After the glass sheets are heated to a temperature sufficient for tempering, they usually cool sufficiently rapidly to temper and, hence strengthen the sheets. The gas hearth furnace 10 will be referred to as a heating area and the area where the glass is cooled to impart at least a partial temper will be referred to as a cooling area.

According to a typical gas hearth operation, the gas support bed 12 is supported on vertically supported jacks (not shown) which support the bed 12 so that its upper surface extends transversely to its length at a slight oblique angle to the horizontal, preferably less than 15° and usually approximately 5°. The glass sheets, while supported on a gaseous support of the gas support bed 12 in such a tilted relation to the horizontal have their lower edges driven by frictional contact with a plurality of rotating driving discs 14 of uniform diameter. Each of the latter is mounted on a different drive shaft 15. The latter are aligned along a line parallel to the longitudinal dimension of the gas bed 12 so that the driving discs 14 have a common inner tangential line extending parallel to the direction of movement of the glass sheets and thereby define a path of movement for the sheets.

Beyond the gas hearth type furnace or heating area 10 is a cooling area 16. At one side of the cooling area are located additional rotating driving discs 14 aligned with the driving discs that propel the glass sheets through the gas hearth type furnace 10. In the cooling area there are longitudinally spaced upper plenum chambers 18 directly opposing a corresponding series of lower plenum chambers 20. The latter are arranged in alignment with the bed 12 to form a continuation thereof at the same orientation of the bed. The upper and lower plenum chambers 18 and 20 direct air into a series of nozzles or modules arranged from the entrance to the exit of the cooling area 16 in a manner such as that depicted in U.S. Pat. No. 4,046,543 to Shields the description of which is incorporated by reference.

Each of the upper plenum chambers 18 is supplied with air under pressure through flexible upper supply conduits 26 and each of the lower plenum chambers 20 is supplied with air under pressure through lower supply conduits 28. The various flexible supply conduits are connected to conventional blower means (not shown) which supply air under pressure in a manner well known in the art. The blowing means is located in the basement of a building which supports the gas hearth furnace and cooling area.

Figure 1:
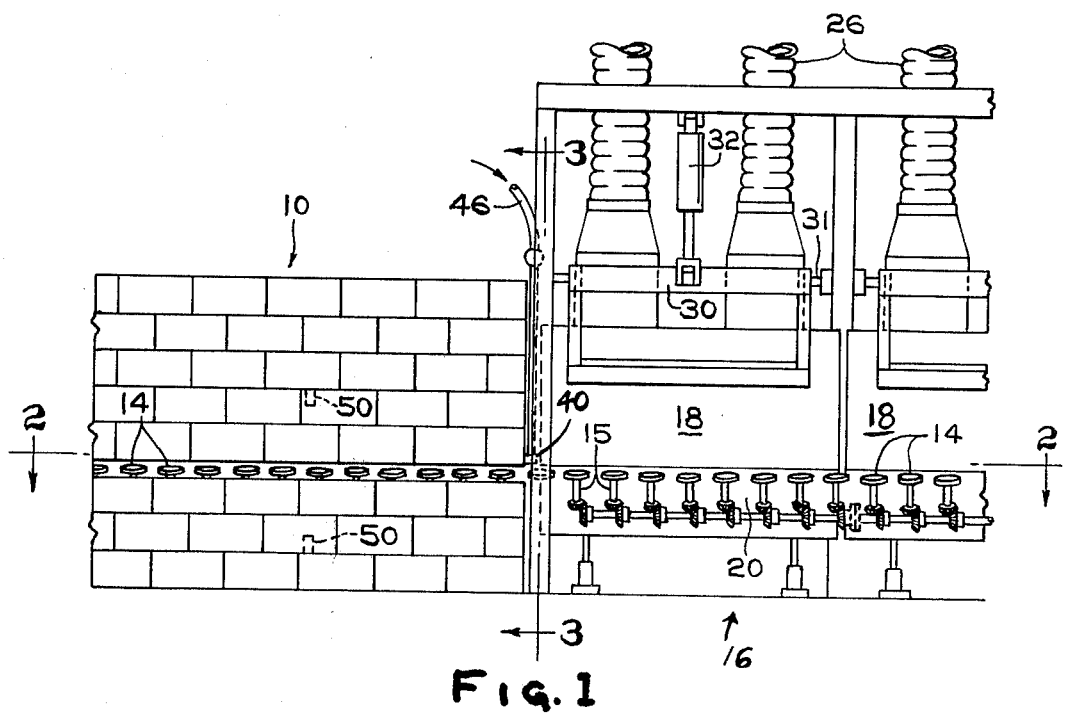
FIG. 1 is a fragmentary, longitudinal, sectional view of an exit portion of a furnace and an entrance portion of a cooling area showing the relative position of a cooling pipe at the boundary region between the exit of the heating area and the entrance to the cooling area.

The upper plenum chamber 18 is carried on a supporting and reinforcing frame 30 which pivots at one end to one transverse side thereof about a pivot means 31. The forward end of the frame as seen in FIG. 1 is attached to a pneumatic cylinder 32 which is capable of lifting the reinforcing frame 30 and the upper plenum chamber 18 in response to a control signal to pivot the upper plenum chamber 18 with respect to the lower plenum chamber 20 whenever access is required between the plenum chambers.

What has been described thus far has been a typical gas hearth type of tempering apparatus for the heat treatment of glass sheets designed to impart a temper therein.

According to the present invention, an apertured pipe 40 is supported at the lower end of an exit door 42 at the exit of the furnace or heating area 10. The apertured pipe 40 communicates at each end with one or the other of a pair of supply pipes 44. The latter are connected to an air line 46 through a valve 48. It is understood that the valve 48 may be provided in each of the feed pipes 44 instead of the main air line 46.

Figure 3:
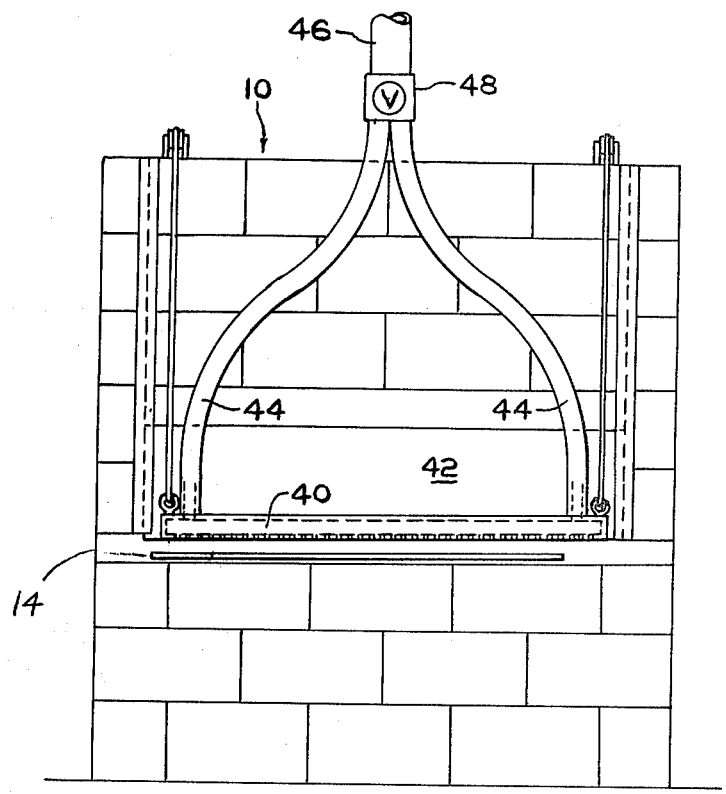
FIG. 3 is a transverse section looking at the exit door of the furnace, showing the location of the pipe relative to the upper surface of a glass sheet leaving the furnace taken along the line 3—3 of FIG. 1.
Figure 4:
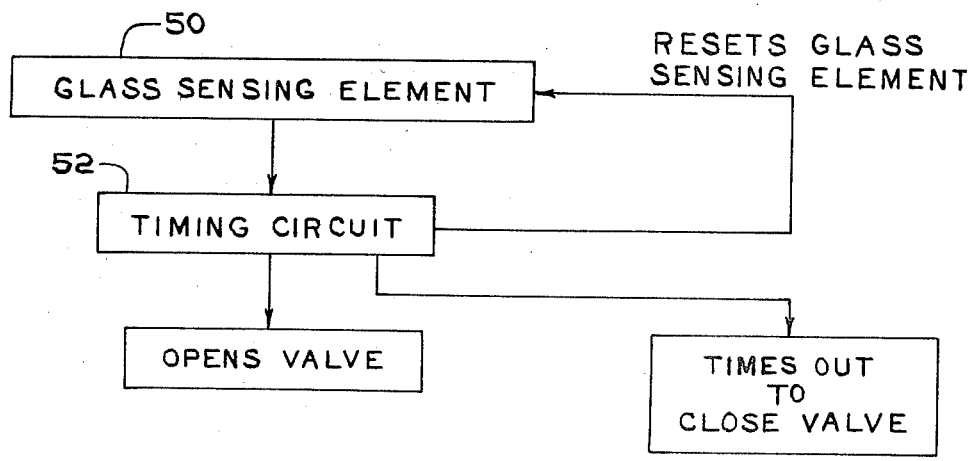
FIG. 4 is a schematic control diagram showing how a glass sensing device initiates the onset and the termination of the application of tempering medium through a pipe located at the boundary region between the exit of the heating area and the entrance to the cooling area in accordance with an important feature of the present invention.

It is also understood that while the apertured pipe 40 is disclosed as being supported at the lower end of the exit door of the furnace, it can also be supported by attachment to the upstream end of the cooling area 16, particularly the upstream edge of the upstream upper plenum area 18 in the boundary region between the exit of the furnace or heating area 10 and the entrance into the cooling area 16. The present invention also comprises a glass sensing element 50 provided within the heating area sufficiently close to the exit door 42 and comprising a transmitter and a receiver disposed in vertical alignment in position to intercept the path of glass sheet travel so that the energy detected by the receiver changes in response to the presence of a glass sheet between the transmitter and the detector. The glass sensing element 50 actuates a timing circuit 52 which is correlated with the speed of movement of the glass sheets to insure that when the leading edge of a glass sheet detected by a glass sensing element 50 reaches a position aligned with the apertured pipe 40 that valve 48 is opened thereby permitting air to be dispensed through the openings in the lower wall of the apertured pipe 40 to be directed across the entire width of the glass sheet in its leading portion only. When a desired length of glass sheet such as 1 foot (30 centimeters) passes beneath the apertured pipe 40, the timing circuit 52 times out to close the valve 48, thereby stopping the selective application of air across the entire width of the upper surface of the glass sheet. It is noted from FIG. 3 that the apertured pipe 40 is in position to face the upper surface of the glass sheet and there is no corresponding air supply means opposite the apertured pipe 40 to provide any forced cooling against the bottom surface of the leading edge portion of the glass sheet during the time that the leading edge portion moves through the position of alignment with the apertured pipe to force cool its upper surface only.

The timing circuit 52 prepares the glass sensing element to be reset whenever the receiver indicates a large signal conforming to the absence of glass to enable the glass sensing element to be in condition to be actuated by the leading edge of the next glass sheet that passes between the transmitter and the receiver. Glass sheets are spaced from one another during their passage through the gas hearth furnace 10. The incorporation of a timing circuit that times out when one foot (30 centimeters) of the glass sheet has passed the position of alignment with the apertured pipe enables the glass sensing element to be reset before the leading edge of the subsequent sheet reaches a position of alignment between the transmitter and the detector of the glass sensing element 50.

The application selectively along a leading edge portion only of the upper surface of the glass sheet provides less expenditure of air than the previous employment of air applied as in the Pytel et al patent against the lower surface of the glass sheet except for its leading edge portion, particularly when the apparatus is being used to temper elongated glass sheets whose length is greater than 2 feet (60 centimeters).

The present invention is also an improvement over an operation wherein the upper surface of the glass is exposed to a continuous application of cold air which warps the glass along its entire length. In the following experiments, leading edge kink was measured by laying a glass sheet on a flat table top with its top surface facing upward. A 1 foot (30 centimeters) straight edge was lightly held parallel to the long dimension of the sheet with one edge of the straight edge aligned with the leading edge of the glass sheet and a tapered wedge graduated in one mil (0.0254 millimeter) graduations was inserted between the straight edge and the upper surface of the glass sheet to measure the maximum separation between the straight edge and the upper glass surface along the opposite side edges of the glass sheet.

Bow or warp was measured by standing the glass upward and hanging a fish line freely along a major surface of the glass sheet and measuring the maximum horizontal distance between the surface of the glass sheet and the free hanging fish line. Bow or warp is measured relative to the entire length of the glass.

Leading edge kink is limited to the deviation from flatness of the first foot (30 centimeters) of length of the glass sheet. Leading edge kink was measured along the edge of the glass engaged by the rotating discs and along the opposite side edge in the experiments that follow.

In the first experiment, leading edge kink was 26 mils (0.66 millimeter) along the driving edge and 18 mils (0.46 millimeter) along the opposite edge with no air applied in the boundary region between the furnace exit and the entrance to the cooling area. The leading edge kink was reduced to 19 mils (0.48 millimeter) minimum and 22 mils (0.56 millimeter) maximum along the drive edge and along the opposite edge to a minimum of 8 mils (0.20 millimeter) and a maximum of 10 mils (0.25 millimeter) by applying plant air through an air pipe 60 inches (1.5 meters) long of ½ inch (1.27 centimeters) circular diameter having 39 inches (1 meter) of air holes ½ inch (1.27 centimeters) apart each 1/16 inch (0.16 centimeter) diameter to the one foot (30 centimeters) long leading edge portion only of the sheets followed by cooling both sides. The pipe was supported about one inch (2.54 centimeters) above the upper surface of the glass sheets. The first series of experiments reported was performed while processing glass sheets 36 inches (0.9 meter) wide by 76 inches (1.9 meters) long having a nominal thickness of about 0.197 inch (5 millimeters). These sheets were passed beneath the apertured portion of the pipe.

Additional experiments were performed on glass sheets 28 inches (0.7 meter) wide by 76 inches (1.9 meters) long having a thickness of about 0.12 inches (3 millimeters). Without any application of air through the pipe, leading edge kink was 28 mils (0.71 millimeter) on the drive edge side and 28 mils (0.71 millimeter) on the opposite side. This was reduced to only 5 mils (0.13 millimeter) on the drive edge side and 10–14 mils (0.25–0.36 millimeter) on the opposite side with the air manually adjusted for on and off. The air pipe was oriented to provide air at a direction normal to the upper surface of the glass.

The plant air line which has a pressure of 70 pounds per square inch (4.93 kilograms per square centimeter) was used to supply the air to the air supply pipe. When air was applied to the leading edge portion only, the bow or warp measured was reduced from 15/64 inch (0.60 centimeter) warp for no air applied through the apertured pipe to no warp up to 14/64 inch (0.56 centimeter) warp along the entire longitudinal dimension of the glass sheet with air applied to the upper surface only along the leading edge only.

In the next experiment, with no air applied through the apertured pipes, the glass sheets had a leading edge kink of 23 mils (0.58 millimeter) on the drive edge side and 22 mils (0.56 millimeter) on the opposite side and a concave bow of 16/64 inch (0.64 centimeter). The application of constant air throughout the entire length of the glass reduced the kink to 5 mils (0.13 millimeter) on the drive edge side and 10–11 mils (0.25–0.28 millimeter) on the opposite side. However, the application of constant air against the entire length of the upper surface had changed the bow from a concave bow to a convex bow that varied from 35/64 inch (1.39 centimeters) to 44/64 inch (1.75 centimeters) in a convex direction. Therefore, it was deemed inadvisable to have a constant flow of air against the upper surface along the entire glass sheet length in the boundary region between the furnace exit and the entrance to the cooling area.

The specific embodiment shows a cooling pipe attached to a door at the exit of the furnace. It is understood that the pipe may be attached to any convenient location in the boundary region between the furnace exit and the entrance to the cooling area. For example, it may be attached to the upstream end of the first plenum chamber, preferably the upper plenum chamber. It is understood that the size and shape of the air supply pipe and the openings in the air supply pipe may be varied depending upon the characteristic features of the production line to develop leading edge kink.

The original pipe of circular cross-section was modified to change the diameter of the holes in the middle eight inches (20.32 centimeters) of the pipe to 3/32 (0.24 centimeter) in diameter instead of 1/16 inch (0.08 centimeter) diameter in order to provide a more uniform flow along the length of the pipe. Such modification provided additional improvements in the reduction of leading edge kink. The original pipe was further modified by changing the openings to 1/8 inch (0.32 centimeter) diameter openings spaced at ½ inch (1.27 centimeters) spacings along the entire 60 inches (1.5 meters) length of the apertured pipe.

The following additional experiments reported in Tables I, II and III were performed on glass sheets 34 inches (0.85 meters) wide by 76 inches (1.90 meters) long using a 60 inches (1.5 meters) long pipe of ⅛ inch (0.32 centimeter) wall thickness disposed one inch (2.54 centimeters) above the path of glass sheet travel in the boundary region and provided with a cross section of one inch (2.54 centimeters) width in the direction of glass sheet movement and a two inches (5.08 centimeters) height. Openings of 1/16 (0.16 centimeter) diameter were provided in the bottom wall every ½ inch (1.27 centimeters) of length thereof. The timer was adjusted to provide continuous air blasts through the pipe at different pressures enumerated for the leading one foot (0.3 meter) of length for the glass sheets that were provided with air on the upper surface only. Regular production by way of comparison was performed with the air pipe in place but no air supplied through the pipe to provide a basis for comparison in these experiments. The glass sheets treated with air on the leading edge portions while the latter passed under the pipe at the boundary region were otherwise treated in the heating area and in the cooling area in the same manner as the sheets not subjected to air flow from the pipe.

TABLE I

| Glass Temperature at Furnace Exit | 1250° F.(676.67° C.) |
| --- | --- |
| Furnace speed | 340 inches (8.5 meters) per minute |
| Speed in cooling area | 830 inches (20.75 meters) per minute |
| Glass Sheet thickness | ⅛ inch (0.32 centimeter) |

| Leading Edge Kink in Mils (Millimeter) | | Bow Inch (Centimeter) | Air Pressure in Pipe Pounds per Square Inch (Kilograms Per Square Centimeter) |
| --- | --- | --- | --- |
| Drive Side Edge | Opposite Edge | | |
| 23(0.58) | 25(0.64) | 25/64(0.99) | Air pipe off |
| 8(0.20) | 15(0.38) | 21/64(0.83) | 30(2.11) |
| 8(0.20) | 10(0.25) | 27/64(1.07) | 40(2.8) |
| 2(0.05) | 5(0.13) | 24/64(0.95) | 60(4.2) |

TABLE II

| Glass Temperature at Furnace Exit | 1240° F. (671.11° C.) |
| --- | --- |
| Furnace Speed | 350 inches (8.75 meters) per minute |
| Speed in Cooling Area | 820 inches (20.5 meters) per minute |
| Glass Thickness | ⅛inch (0.32 centimeter) |

| Leading Edge Kink in Mils (Millimeter) | | Bow Inch (Centimeter) | Air Pressure in Pipe Pounds per Square Inch (Kilograms per Square Centimeter) |
| --- | --- | --- | --- |
| Drive Side Edge | Opposite Edge | | |
| 25(0.64) | 28(0.71) | 13/64(0.52) | Air pipe off |
| 8(0.20) | 11(0.28) | 14/64(0.56) | 50(3.5) |

TABLE III

| Glass Temperature at Furnace Exit | 1160° F. (626.76° C.) |
| --- | --- |
| Furnace Speed | 210 inches (5.25 meters) per minute |
| Speed in Cooling Area | 810 inches (20.25 meters) per minute |
| Glass Thickness | 3/16 inch (0.48 centimeters) |

| Leading Edge Kink in Mils (Millimeter) | | Bow Inch (Centimeter) | Air Pressure in Pipe Pounds per Square Inch (Kilograms per Square Meter) |
| --- | --- | --- | --- |
| Drive Side Edge | Opposite Edge | | |
| 28(0.71) | 28(0.71) | 10/64(0.40) | Air pipe off |
| 5(0.13) | 3(0.08) | 9/64(3.57) | 50(3.5) |

The last reported experiments reduced the leading edge kink to well within acceptable limits without causing any significant impairment of bow for the overall length of the specimens. The results of the experiments, particularly those reported in Tables I, II and III have led to a commercial installation of an air pipe of rectangular cross-section with encouraging results. It appears that optimum results are obtained in the particular line in which the apertured pipe is installed when the timing of the application of air blasts through the air pipe is such that only the leading 12 inches (30 centimeters) of the glass sheet is subjected to a flow of air through the air pipe against the upper surface in the absence of any upward flow against the bottom surface as the leading edge portion (one foot [30 centimeters]) passes through the boundary region between the exit of the heating area or furnace 10 and the entrance to the cooling area 16.

The form of the invention shown and described in this disclosure represents an illustrative preferred embodiment thereof. It is understood that various changes may be made without departing from the gist of the invention as defined in the claimed subject matter which follows.

I claim:

1. A method of minimizing leading edge curl during the tempering of glass sheets having upper and lower major surfaces, opposed leading and trailing edge portions and opposed side edges which comprises:
   sequentially moving the sheets in a substantially horizontal orientation through, (a) heating means wherein the sheets are heated to a temperature sufficient for tempering the sheets; (b) a tempering zone including a cooling means for simultaneously applying a cooling fluid to the upper and lower major surfaces of the sheets in an amount and at a rate sufficient to impart a temper to the sheets, the heating and cooling means each having upstream and downstream openings to permit the movement of the sheets through the heating and cooling means; and (c) a boundary region embracing the downstream opening of the heating means and the upstream opening of the cooling means; and
   initially directing a cooling fluid in the boundary region to only the leading edge portion of the upper major surface of each sheet, the leading edge portion encompassing a zone extending from the leading edge of the sheet to up to about 50 percent of the length of the sheet and discontinuing the flow of the cooling fluid after the leading edge portion has been cooled to minimize leading edge curl of the sheet in the tempering zone.

2. The method as set forth in claim 1 wherein said initially directing step is practiced by directing air toward only the leading edge portion of the upper major surface of the sheet.

3. The method as set forth in claim 1 wherein said initially directing step is practiced by applying streams of tempering medium toward only the leading edge portion of the upper major surface of the sheet.

4. The method as set forth in claim 3 wherein the streams of tempering mediums are streams of compressed air and the streams directed toward the center portion of the sheet between the side edges have a greater rate of flow than the streams directed at the side edges of the sheet.

5. The method as set forth in claim 1 wherein the leading edge portion encompasses a zone extending from the leading edge of the sheet to up to about 16 percent of the length of the sheet.

* * * * *